Oct. 21, 1952     W. Z. HORVAT ET AL     2,614,486
ROTARY VERTICAL BROILER FOR FRANKFURTERS
OR SIMILAR ARTICLES
Filed April 12, 1950     2 SHEETS—SHEET 1

INVENTORS
WILLIAM Z. HORVAT
BY BERNARD R. GLASS

Philip S. McLean
ATTORNEY

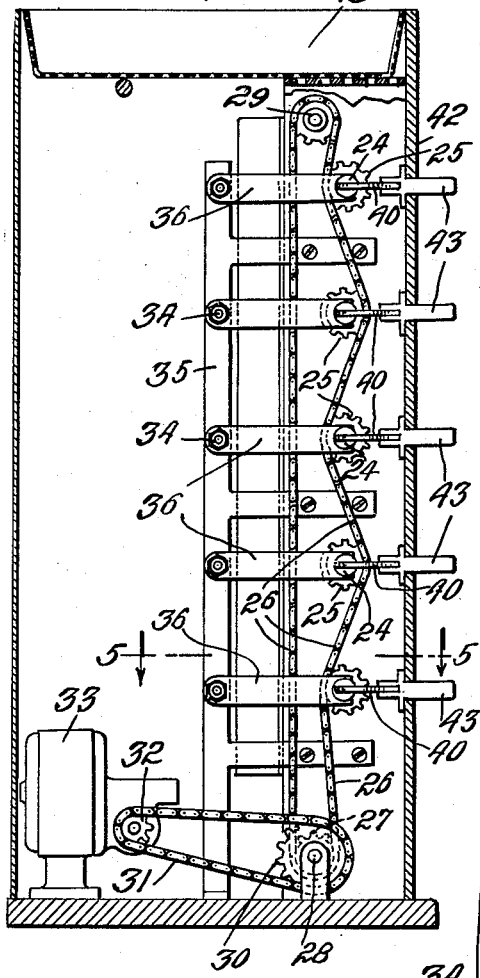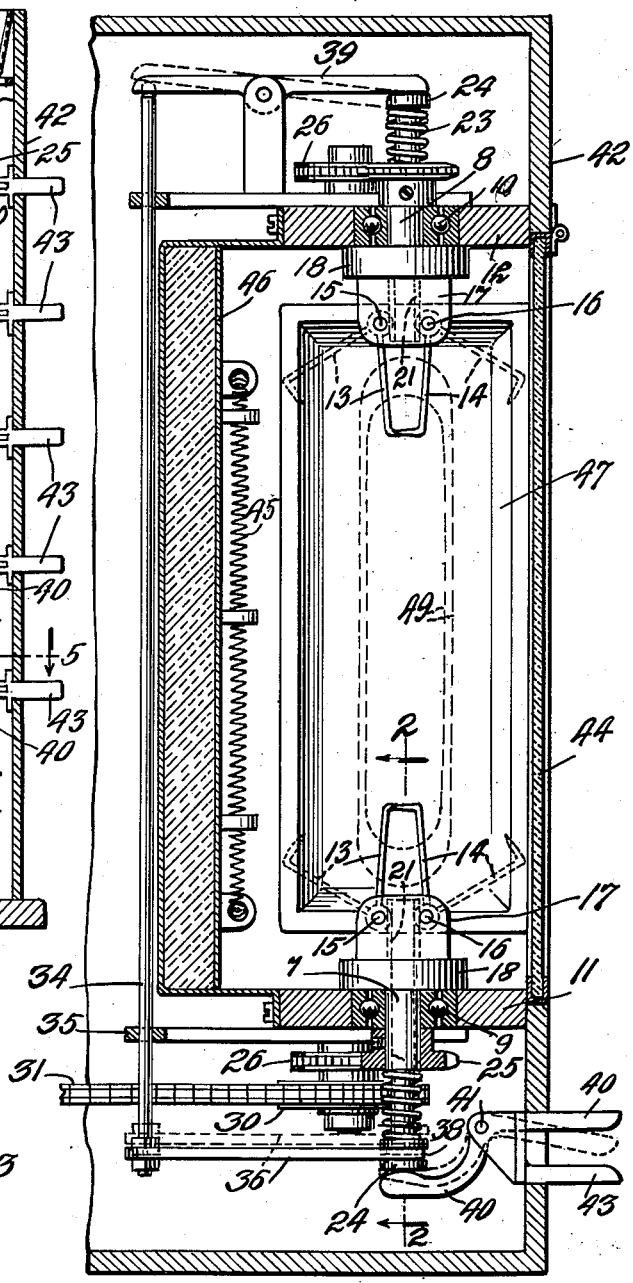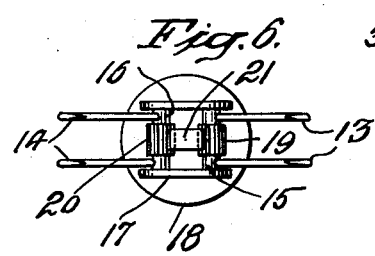

Patented Oct. 21, 1952

2,614,486

UNITED STATES PATENT OFFICE 2,614,486

ROTARY VERTICAL BROILER FOR FRANKFURTERS OR SIMILAR ARTICLES

William Z. Horvat, Hollis, and Bernard R. Glass, Forest Hills, N. Y.

Application April 12, 1950, Serial No. 155,492

1 Claim. (Cl. 99—421)

The invention herein disclosed relates to the cooking of frankfurters, chops, meat strips, bacon and other food products, by barbecue or rotary broiler methods.

Objects of the invention are to provide a simple, practical construction in which the frankfurters or other articles to be broiled may be quickly and easily placed and then be uniformly broiled or grilled in a rotating action exposed to an appropriate heating medium.

Special objects of the invention are to provide means for holding the frankfurters, sausages or other such items in proper rotating relation and which means can be opened up and closed, as required, to receive or to release the items and to hold them securely while cooking is in progress and to enable the cooking to be carried on under variable conditions such as low, medium and high heat.

Other special objects of the invention are to provide a construction of this character which will hold one or a number of articles being cooked and which may be utilized therefore, as required, to cook a single or a desired number of items.

Further special objects of the invention are to provide a rotary vertical broiler or barbecue form of cooker which will attractively display the articles being cooked and arouse interest in and to the operation of the same and promote sale of the product. It is in line with this object to provide the apparatus in a form suitable for restaurant and lunch counter display.

Further important objects of the invention are to provide a machine having the advantages mentioned which will be of reasonable cost and of relatively small size so as to be practical for general use and which will be portable in character and adapted to be used wherever an electric outlet is available.

Other desirable objects attained by the invention are set forth or will appear in the course of the following specification.

The drawings accompanying and forming part of the specification illustrate a present commercial embodiment of the invention. Structure, however, may be modified and changed as regards this illustration, all within the true intent and broad scope of the invention as hereinafter defined and claimed.

Fig. 1 in the drawings is a front elevation of the broiler or barbecue apparatus with portions broken away and parts shown in section;

Figs. 2 and 3 are enlarged broken sectional details illustrative of the rotary fingers for holding and turning the frankfurters or other objects, Fig. 2 being taken as on substantially the plane of line 2—2 of Fig. 5, and Fig. 3 taken as on substantially the plane of line 3—3 of Fig. 2;

Fig. 4 is a broken vertical sectional view of the machine as on substantially the plane of line 4—4 of Fig. 1;

Fig. 5 is an enlarged horizontal sectional view as on substantially the plane of line 5—5 of Fig. 4;

Fig. 6 is an end view of one of the rotary holders in the opened relation as shown in Fig. 3.

Figure 1:
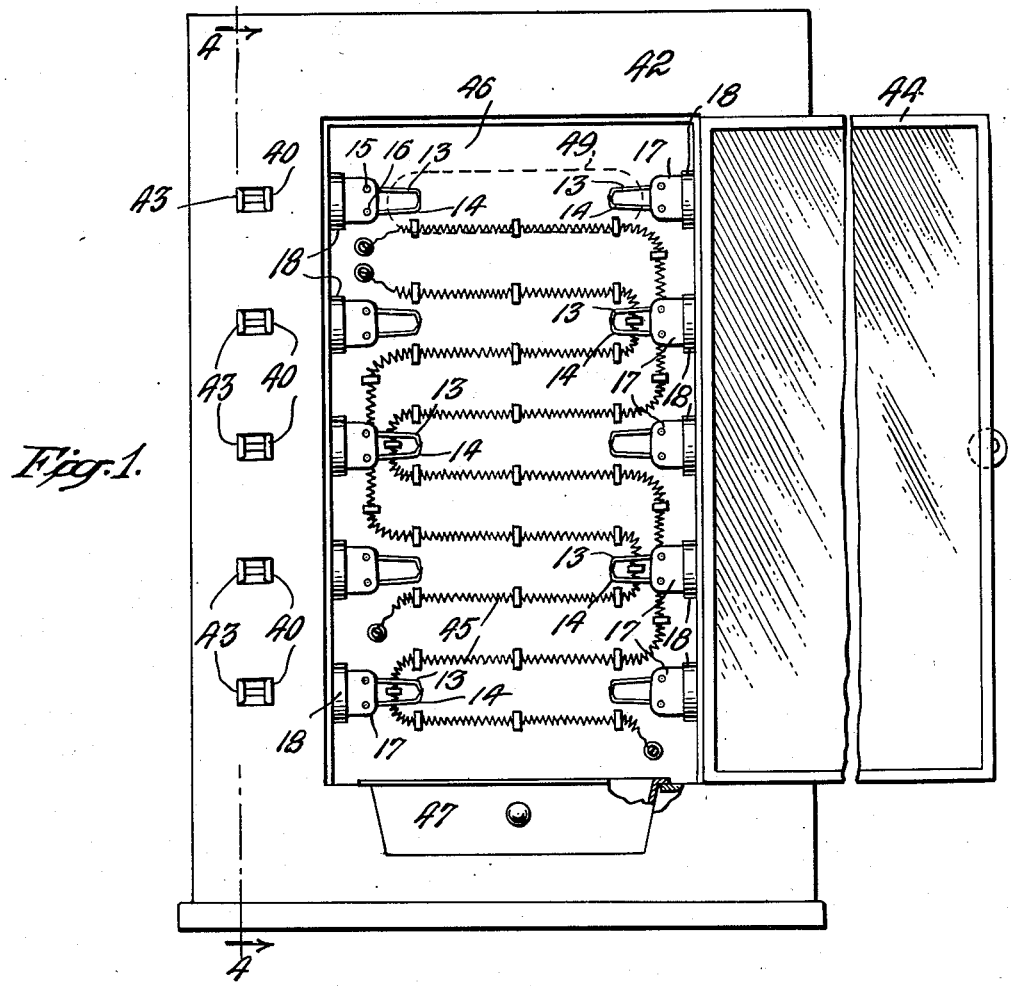

The machine shown is designed for broiling or barbecuing one or a number of frankfurters, up to five, and is shown as comprising five pairs of rotary holders disposed one above the other, in front of a panel carrying electric heating elements, all within an attractive case or oven suitable for counter display.

Each pair of rotary holders consists, as shown in Fig. 5, of oppositely disposed spindles 7, 8, supported by ball bearings 9, 10, in spaced upright walls or supports 11, 12, and carrying fingers to grip the frankfurters or other objects, and which can be opened and closed, as required, to release or to grip such objects.

Specifically the fingers for each holder are shown as consisting of pairs of opposed, angled and pointed tines or forks 13, 14, on rock shafts 15, 16, journaled between spaced lugs 17 on the collars 18 at the inner ends of the shafts 7 and 8.

The rock shafts 15, 16, are shown equipped with pinions 19, 20, engaged by the teeth of a double faced rack 21 slidable in the supporting shaft or spindle 7 or 8, the latter being of tubular form to pass the extended stem portion 22 of the rack.

Figures 2, 3:
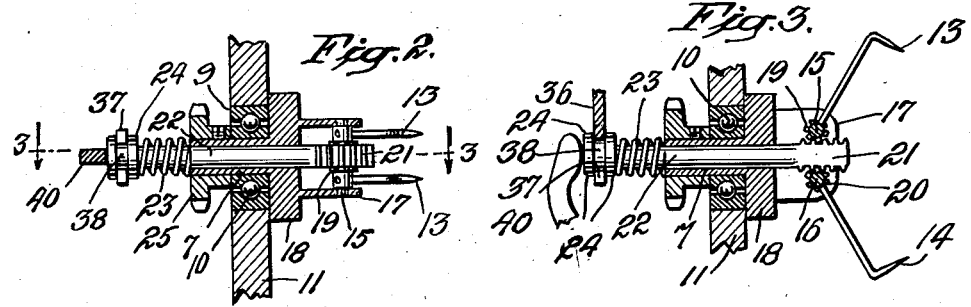

Springs 23 surrounding the outer ends of the rack stems draw the racks outwardly so as to yieldingly hold the fingers in the closed position. By forcing the rack stems inwardly against the tension of these springs, the fingers may be opened to the position shown in Figs. 3 and 6 and in dotted lines, Fig. 5.

The fork or jaw closing springs 23 are shown as engaged between collars 24 on the outer ends of the rack stems and the sprocket pinions 25 which are fixed on the tubular shafts 7 and 8.

The latter are shown in Fig. 4 as having sprocket chains 26 zigzagged thereover to keep the chains tight and to turn the alternate holders in opposite directions.

These chains run from sprockets 27 on a shaft 28 at the bottom, up over supporting pinions 29 at the top, and shaft 28 is shown as carrying a pinion 30 engaged by chain 31 operated through reduction gear 32 from electric motor 33.

To effect simultaneous opening and closing of the companion forks, fingers or jaws of each holder, the construction shown in Fig. 5 is provided, embodying a slide rod 34 supported in brackets 35, having an arm 36 at one end forked at 37 to enter the groove 38 in the collar 24 of the rack stem 22 in spindle 7 and engaging at the opposite end one end of a pivoted lever 39 which at its opposite end engages the collar 24 of the rack stem 22 in the other, companion spindle 8.

The shift rods 34 are actuated in the present instance by finger levers 40 pivoted at 41, Fig. 5, and engaging the thrust collars 24 on the ends of the rack stems in the tubular spindles or shafts 7.

The control levers 40, in the present disclosure, are exposed at the front of the oven casing 42 and rigid grips 43 are provided opposite the finger grip portion of each lever, enabling these levers to be actuated by a simple pinch grip form of operation.

The front of the oven casing is shown as having a swinging door 44 to provide full access to the rotating holders, and preferably transparent so that the cooking operation may be observed.

The heat for the cooking operation is supplied in the present disclosure by electrical heating elements 45 on the front of a supporting panel 46, in back of the rotary holders.

The heating circuit may be connected with the control circuit for the motor so that both heat and motor will be turned on and off at the same time, or the circuits may be separated and independently controlled. Also, the heating circuit may be broken up to furnish heat as may be desired for the different individual barbecue units.

A removable drip pan 47 is shown provided at the bottom of the cabinet, and the top of the cabinet is shown equipped with a perforate tray 48, Fig. 4, for heating rolls or the like that might be used with the frankfurters or other foods being cooked, through the medium of the heat escaping from the box or cabinet.

Fig. 5 shows in broken lines how the companion jaws of the holders may be swung wide open to receive frankfurters or other objects, and it will be noted in this view that the forks or jaws are relatively long so as to hold objects of different length such as represented at 49.

The two tines which form the fork of each jaw may be made of stiff spring wire and with pointed, sharply angled ends which, as they close, will penetrate and pull the frankfurter lengthwise, thus to hold the article in a tensioned relation, preventing sagging and causing it to turn evenly and be uniformly cooked. The length of the jaws also has a centering influence since they will overlie the end portions of the frankfurters as the jaws swing to the closed position. As only the points of the forks or jaws penetrate the food, it is easy to keep the machine in clean, sanitary condition.

The rotating frankfurters or other food, as viewed through the transparent door of the cabinet, present an attractive and appetizing display, rendering the machine desirable for self-advertising purposes and for promoting sale of the food being cooked. The parts are all of simple, durable construction, not liable to get out of order and not requiring any special attention. Each of the holders is separately controllable through the medium of the finger levers 40, so that only one or any number may be used at any time, as required.

A vertical wall back of the heater elements may be made slidably removable through the top or side of the cabinet so that it may be readily cleaned. For one example, this may be a heat-proof glass panel slidably mounted in front of a stainless steel reflector, which can be readily removed at any time for cleaning purposes.

What is claimed is:

A rotary broiler comprising a heater, tubular spindles journaled in separated, aligned relation in front of said heater, tubular heads on the inner, opposing ends of said tubular spindles, racks longitudinally slidable in and extending through said rotary spindles and heads and provided with stems projecting beyond the outer ends of the spindles, rock shafts journaled on said heads at opposite sides of said racks and having pinions engaged by said racks, food holding forks projecting from said rock shafts and having angularly extending tines at the free ends of the same cooperable to hold the end of a frankfurter therebetween, gears on the outer ends of said rotary spindles, drive means engaging said gears for rotating the spindles in unison, collars on the outer ends of the rack stems, springs engaged between said collars and said gears for tensioning the rack stems outwardly whereby to cause the racks to yieldingly hold the rotatably supported forks in closed relation with the tines approached for gripping a frankfurter therebetween and manually operable means for simultaneously thrusting the rack stems inwardly against the tension of said springs for simultaneously opening the companion forks.

WILLIAM Z. HORVAT.
BERNARD R. GLASS.

REFERENCES CITED

The following references are of record in the file of this patent:

UNITED STATES PATENTS

| Number | Name | Date |
|---|---|---|
| 270,277 | Brookes | Jan. 9, 1883 |
| 311,662 | Knight | Feb. 3, 1885 |
| 1,832,854 | Blier | Nov. 24, 1931 |
| 1,994,894 | Marcotte | Mar. 19, 1935 |
| 2,083,717 | Kohn | June 15, 1937 |
| 2,269,178 | Breneman | Jan. 6, 1942 |
| 2,506,318 | Steriss | May 2, 1950 |

FOREIGN PATENTS

| Number | Country | Date |
|---|---|---|
| 276,053 | Great Britain | Aug. 15, 1927 |